United States Patent [19]

Davies et al.

[11] Patent Number: 4,539,362
[45] Date of Patent: Sep. 3, 1985

[54] POLYMERIZATION PROCESS

[75] Inventors: Stephen P. Davies, Melbourne, Australia; Morice W. Thompson, Maidenhead, England

[73] Assignee: Imperial Chemical Industries PLC, London, England

[21] Appl. No.: 494,886

[22] Filed: May 16, 1983

[30] Foreign Application Priority Data

May 20, 1982 [GB] United Kingdom ................ 8214675

[51] Int. Cl.³ .............................................. C08L 33/04
[52] U.S. Cl. .................................... 524/458; 524/460; 524/457; 524/459; 526/201
[58] Field of Search ............... 524/458, 460, 457, 459; 526/201, 203

[56] References Cited

U.S. PATENT DOCUMENTS 3,635,867 1/1972 Yuille ................................. 524/457
4,322,328 3/1982 Graetz et al. ....................... 524/458

OTHER PUBLICATIONS

Technical Bulletin "Azo Polymerization Initiators"; Wako Chemical Company.

Primary Examiner—Paul R. Michl
Assistant Examiner—Alex H. Walker
Attorney, Agent, or Firm—Cushman, Darby & Cushman

[57] ABSTRACT

Sterically stabilized aqueous polymer dispersions free from charged species are made by emulsifying in water ethylenically unsaturated monomer(s), soluble in water to the extent of 0.%–8% by weight but giving rise to a polymer which is insoluble, and polymerizing the monomer(s) in that state in the presence of (a) a non-ionizable azo initiator which is water-soluble and substantially monomer-insoluble and (b) a block or graft copolymer stabilizer of specified structure.

9 Claims, No Drawings

POLYMERIZATION PROCESS

This invention relates to the preparation of dispersions in aqueous media of polymers derived from ethylenically unsaturated monomers, more particularly to a method of preparing such dispersions which avoids the use of ionisable species as polymerisation initiator, as emulsifier for the monomer or as stabiliser for the polymer disperse phase, and which results in the production of a dispersion in which the stabilisation of the disperse phase is wholly steric in character.

The so-called aqueous emulsion polymerisation of ethylenically unsaturated monomers is a very well known process. It is somewhat misleadingly named inasmuch as, although the bulk of the monomer which is to be polymerised exists initially as droplets emulsified in the aqueous medium employed, the actual polymerisation initially takes place not within those droplets but within the aqueous medium, in which a significant concentration of dissolved monomer is maintained throughout the process. For this reason, the technique is not applicable to monomers which have a negligible solubility in water. Arising from this, the process calls for the presence, firstly, of a surfactant dissolved in the aqueous medium whereby the emulsified droplets of monomer are stabilised whilst in effect constituting a reservoir from which monomer in solution in the aqueous medium is replenished as polymerisation proceeds; secondly, it requires the presence of a free-radical type polymerisation initiator which is soluble in the aqueous medium, in order to bring about polymerisation of the dissolved monomer rather than of the emulsified material. It has become customary to use ionisable compounds for both of these functions. Thus there are commonly used as surfactants such anionic substances as sodium dodecylbenzenesulphonate, sodium dioctylsulphosuccinate and the alkali metal or ammonium salts of sulphonated fatty alcohols, and as polymerisation initiators water-soluble per-compounds, such as ammonium persulphate or potassium persulphate. In the resulting dispersions, the polymer particles of the disperse phase are stabilised against gross flocculation or aggregation by the presence on their surfaces of electrically charged species derived from these ionisable surfactants and/or initiators. This stability of the disperse phase is, however, rather readily disturbed by certain external influences to which the dispersions may be subjected, in particular by shear forces, by the introduction of polyvalent ions, by freeze-thaw conditions or by pH changes.

It has already been proposed, in British Patent Specification No. 1,196,247, to prepare aqueous dispersions of synthetic polymers in which the polymer particles are stabilised against gross flocculation by a different, steric mechanism, namely by means of the presence in the dispersion of an amphipathic polymeric stabiliser which has the ability to form around each particle a protective barrier of polymer chains which are solvated by the aqueous medium. By this procedure, the presence on the polymer particles of charged species derived from a conventional ionic surfactant is avoided, but no emphasis is placed in the above-mentioned specification upon the desirability of avoiding also the use of ionic initiators and indeed the use of such materials as ammonium persulphate or potassium persulphate is proposed.

There has also previously been described, in British Patent Specification No. 1,544,335, a process for polymerising an ethylenically unsaturated monomer in water in the presence of a catalyst and also in the presence of a block copolymer dispersion stabiliser which contains at least two polymeric blocks of which one is hydrophilic and the other is hydrophobic, the hydrophilic blocks serving to provide a stabilising barrier around the polymer particles. Here again the introduction of charged species by the use of a conventional surfactant is avoided, but there is no reference to the desirability of using non-ionic initiators and the initiators described as being suitable include a number of the ionic type.

We have now found that wholly non-charged stable aqueous dispersions of synthetic addition polymers can be made by combining the steric mode of polymer stabilisation mentioned above with the use of non-ionic free-radical polymerisation initiators which are characterised by being soluble in the aqueous phase but substantially insoluble in the monomer phase.

According to the present invention there is provided a polymerisation process in which at least one ethylenically unsaturated monomer, having a solubility in water in the range 0.08–8% by weight but giving rise to a polymer which is insoluble in water, is emulsified in water and is subjected in that state to polymerisation in the presence of (a) a non-ionisable free-radical organic azo polymerisation initiator which is water-soluble and is substantially insoluble in the monomer or monomers and (b) an amphipathic steric stabiliser for the polymer particles produced which is a block or graft copolymer containing in the molecule a polymeric component of one type which has a molecular weight of at least 700, preferably at least 1000, and is solvatable by the aqueous phase, and a polymeric component of another type which has a molecular weight of at least 700, preferably at least 2000, is not solvatable by the aqueous phase and is capable of becoming associated with the said polymer particles.

Ethylenically unsaturated monomers which may be polymerised by the process of the invention include, for example, acrylic monomers such as methyl methacrylate, ethyl methacrylate, butyl methacrylate, methoxypropyl methacrylate, cyclohexyl methacrylate, benzyl methacrylate, hydroxyethyl methacrylate, hydroxypropyl methacrylate, dimethylaminoethyl methacrylate, ethyl acrylate, butyl acrylate, hydroxybutyl acrylate, N-butoxymethyl acrylamide, N-butoxymethyl methacrylamide, glycidyl acrylate and glycidyl methacrylate, vinyl monomers such as vinyl acetate, vinyl propionate, styrene, vinyl toluene, methoxystyrene, and vinyl pyridine, and halogenated vinyl monomers such as vinyl chloride and vinylidene chloride. All these monomers exhibit the required minimum solubility in water. There may, if desired, be used together with one or more of such monomers a minor proportion of a monomer having an insignificant solubility in water, for example 2-ethylhexyl acrylate or stearyl methacrylate, which would not be polymerisable on its own by the aqueous emulsion procedure.

The process of the invention may be performed according to two different broad embodiments. In the first of these, the water-soluble azo polymerisation initiator and the block or graft copolymer stabiliser as hereinabove defined are distinct substances separately performing the respective functions. The initiator is introduced as such into the polymerisation mixture, whilst the stabiliser may either be introduced as a pre-formed copolymer or be formed in situ during the polymerisation from a suitable water-soluble polymeric precursor. In the second embodiment, the initiator molecule itself incorporates a water-soluble polymer chain and, besides acting as a source of free radicals, it is able to give rise to a stabilising copolymer during the polymerisation.

Initiators which are suitable for use according to the first of these embodiments are organic azo compounds which are capable of decomposing on heating to give free radicals, are free from ionisable or charged groups and incapable of giving rise to ionic or charged species during the polymerisation reaction, and are preferentially water-soluble in the sense that, whilst they may not be completely insoluble in the monomer or monomers being polymerised when water is absent, they are overwhelmingly present in the aqueous phase of the polymerisation mixture. Preferred initiators of this type are those which exhibit a distribution ratio between water and pure styrene of at least 12, and preferably of at least 20.

Classes of azo compounds containing in the molecule water-solubilising groups which are suitable for use in the embodiment in question include the following:

(i) Compounds satisfying the foregoing distribution ratio requirement and having the general formula

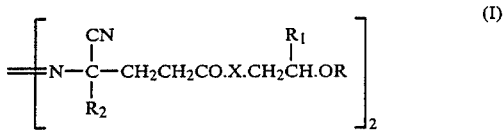

in which R and $R_1$ are independently hydrogen or a methyl group, $R_2$ is an alkyl group containing from 1 to 4 carbon atoms, and X is oxygen or a group $-NR_3$ where $R_3$ is hydrogen or a grouping

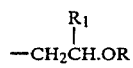

The compounds in question are thus either esters or substituted amides of an azobiscarboxylic acid. Examples of suitable initiators of this class include the bis(diethanolamide) of 4,4'-azobis(cyanopentanoic acid), having the formula

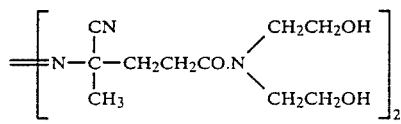

and having a distribution ratio between water and styrene of 463, and the corresponding bis(diisopropanolamide) having the formula

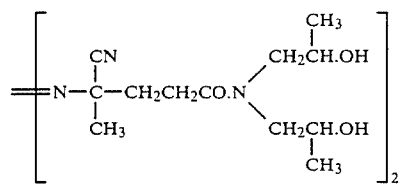

and having a distribution ratio between water and styrene of 23.

The corresponding bis(ethanolamide) is not suitable for use in the process, it having a distribution ratio of about 10.

The above compounds may be prepared by reacting the appropriate azobiscarboxylic acid halide with the appropriate hydroxy or amino compound in known manner in the presence of a hydrogen halide acceptor.

(ii) Compounds satisfying the foregoing distribution ratio requirement and having the general formula

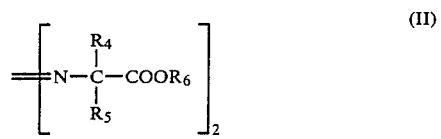

where $R_4$ is a methyl group, $R_5$ is a methyl or ethyl group or $R_4$ and $R_5$ together with the intermediate carbon atom form a cyclohexyl group, and $R_6$ is the residue of a monohydroxy compound.

An Example of a suitable initiator of this class includes the bis-ester of 2,2'-azobis(2-methylpropanoic acid) with 2-ethoxyethanol.

These esters may be prepared by way of the Pinner reaction in which, for example, 2,2'-azobis(2-methylpropionitrile) is reacted under anhydrous conditions with an excess of the appropriate hydroxy compound in the presence of hydrogen chloride to form an iminoether; this intermediate product is then hydrolysed to give the corresponding carboxylic ester. There may with advantage be employed in the making of such compounds the modification of the Pinner reaction which is described in our U.S. patent application No. 440,343, filed 11-9-82; now abandoned. In this modification, the hydroxy compound is required to be used in stoichiometric proportion only, in the presence of a compound containing an ether grouping.

(iii) Compounds satisfying the foregoing distribution ratio requirement and having the general formula

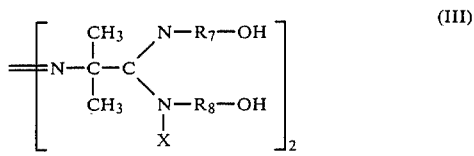

where $R_7$ and $R_8$ are linear or branched alkylene residues of 2-4 carbon atoms and X is hydrogen or a grouping $R_8-OH$. These compounds are described in German Offenlegungsschrift No. 2841033 and European Patent Application No. 0009186 A1, and may be obtained by reacting an iminoether, derived from azobis(2-methylpropionitrile) by the Pinner reaction, with a mono- or di-alkanolamine and optionally (where a monoalkanolamine has been used) further reacting the product with an alkylene oxide.

(iv) Compounds satisfying the foregoing distribution ratio requirement and having the general formula

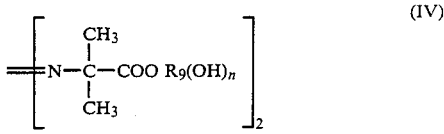

(IV)

where $R_9$ is the residue of an aliphatic polyhydroxy compound $R_9(OH)_{n+1}$ after removal of one hydroxyl group therefrom and n has the value 2 or 4. Examples of suitable initiators of this class include the bis(2-dihydroxypropyl) ester of 2,2'-azobis(2-methylpropanoic acid) and the bis-(5,6-dihydroxyhexyl) ester of the same acid.

These esters may be prepared by the method described in our British Application No. 8308951, which consists in reacting 2,2'-azobis(2-methylpropionitrile) with a stoichiometric amount of an acetal or ketal derivative of the formula

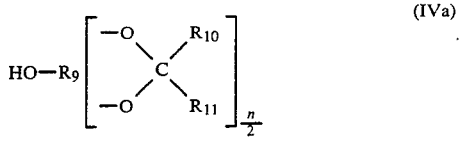

(IVa)

where $R_9$ and n have their previous significance, $R_{10}$ is hydrogen or an alkyl or aryl group and $R_{11}$ is an alkyl or aryl group, or $R_{10}$ and $R_{11}$ together with the intermediate carbon atom form a cycloalkyl group, in the presence of hydrogen chloride gas under anhydrous conditions, followed by hydrolysis of the intermediate iminoether hydrochloride and of the acetal or ketal grouping or groupings.

The proportion of the water-soluble polymerisation initiator which is used in this first embodiment of the invention may vary considerably according to the particular monomers which are being polymerised and the rate at which it is desired the polymerisation should proceed, and the optimum amount may readily be ascertained by simple experiment. Typically, however, the initiator is used in an amount ranging from 0.1 mol. % to 3.0 mol. % based on the amount of monomer.

Continuing the consideration of the first embodiment of the present invention, the amphipathic steric stabiliser which is required to be present during the polymerisation, in order to stabilise the polymer particles formed against gross flocculation, may, as already indicated, be either added to the polymerisation mixture initially as a pre-formed material, or it may be formed in situ during the polymerisation from a suitable precursor molecule.

Where the stabiliser used is pre-formed, it will be a block or graft copolymer containing in the molecule one type of polymeric component which is solvatable by the aqueous phase in the sense that, if the component in question were an independent molecule rather than part of the graft copolymer, it would actually be soluble in that phase; by virtue of this solvatable character, the polymer chains of this component adopt an extended configuration in the aqueous phase so as to form a steric barrier around the particles. The copolymer also contains in the molecule another type of polymeric component which is not solvatable by the aqueous phase and is capable of becoming associated with the polymer particles. Examples of suitable water-soluble polymers from which the solvatable component of the stabiliser may be derived include the polyethylene glycols and their monoalkyl ethers in which the alkyl group contains from 1 to 4 carbon atoms, poly(ethylene oxide) -poly(-propylene oxide) copolymers containing at least 40% of ethylene oxide and the monoalkyl ethers of such copolymers, polyvinylpyrrolidone, polyacrylamide, polymethacrylamide, polyvinyl alcohol and poly-bis(hydroxyethyl)methacrylamide. The molecular weight of this component is at least 700 and preferably at least 1000. The preferred solvatable components are those derived from polyethylene glycols, or their monomethyl ethers, of molecular weight in the range 2000–4000.

The second component of the block or graft copolymer, which is capable of associating with the disperse particles, can in the simplest case be of identical or similar chemical composition to the disperse polymer itself, which by definition is insoluble in (and therefore not solvated by) the aqueous medium. Such a polymeric component will have an inherent tendency to associate with the disperse polymer. However, any polymer which satisfies the more general requirement of non-solvatability by the aqueous medium is suitable as the second component. Examples of second polymeric components include polymers and copolymers derived from methyl methacrylate, ethyl acrylate, butyl acrylate, and vinyl acetate; there may also be incorporated together with one or more of these monomers a functional monomer such as acrylic acid, methacrylic acid, 2-hydroxyethyl methacrylate and 2-hydroxyisopropyl methacrylate.

The pre-formed block or graft copolymer may range in structure from simple block copolymers of the AB, ABA or BAB types, where A and B represent the solvatable and nonsolvatable components respectively, through multiple block copolymers of the ABABAB... types, to "comb" type graft copolymers of the structure $A_nB$, in which a plurality of the solvatable A components are attached at intervals to a polymer backbone constituting the hydrophobic, associatable B component. Preferably the copolymer is of this last-mentioned, "comb" type and has a slight weight excess of the solvatable components A over the nonsolvatable components B, for example in a ratio of from 1.1:1 to 2:1. It is also preferred that, in this type of copolymer, the value of n, i.e., the number of A components which are attached to each B component, should be in the range 3–10.

The molecular weight of each solvatable A component is, as already stated, at least 700 and preferably at least 1000; the molecular weight of each non-solvated B component is at least 700 and preferably at least 1000. Moreover, it is preferred that the total molecular weight of the copolymer should be at least 5000.

The block or graft copolymer may be made by any of the methods which are well known in the art. Thus the solvatable component may be prepared first and then copolymerised with the appropriate monomers so as to give rise to the non-solvatable, associating component in situ, or the non-solvatable component may be prepared first and the solvatable component then prepared in situ. Alternatively, the individual components can both be prepared separately and then be covalently linked to one another through the medium of suitable mutually reactive groups. Thus, for example, in the preparation of the preferred "comb" type graft copolymers, a water-soluble polymer suitable as the A component, such as the mono-methyl ether of a polyethylene glycol of molecular weight 2000 to 4000, can be converted to the acrylic or methacrylic ester, and this intermediate product can then be subjected to free radical initiated copolymerisation with other unsaturated monomers such as styrene, ethyl acrylate or methyl methacrylate, in order to build up an appropriate non-solvatable polymer backbone constituting the B component from which are pendant a plurality of the A component side chains. Another suitable type of addition copolymer may be made by means of ionic polymerisation methods, for example by preparing a "living" polystyrene block and then reacting this with ethylene oxide in order to build up a poly-(oxyethylene) block attached thereto.

If desired, the non-solvatable component of the block or graft copolymer employed as stabiliser may contain groupings which are capable of reacting with the monomer or monomers which are being polymerised in the process of the invention. By this means, the stabiliser becomes covalently linked to the disperse polymer and the stability of the latter towards flocculation may be enhanced. Suitable reactive groupings include ethylenically unsaturated groupings which can copolymerise with the monomer, or functional groups which can react under the conditions of polymerisation with complementary functional groups in the monomer, e.g., epoxide groups which can react with a hydroxylic monomer such as 2-hydroxyethyl methacrylate. Methods of introducing such reactive groupings into the copolymer molecule will be apparent to those skilled in the art; for example, in the preparation of a "comb" type graft copolymer as outlined above, the unsaturated monomers with which the intermediate acrylic or methacrylic ester of polyethylene glycol is copolymerised may include an epoxide group-containing monomer, such as glycidyl acrylate or glycidyl methacrylate. In this way, the non-solvatable polymer backbone of the copolymer which is built up will be caused to contain pendant glycidyl groups. The latter may be utilised directly to react with a main monomer containing a functional group, such as a hydroxyl group, during the polymerisation process of the invention. Alternatively, the graft copolymer containing the glycidyl groups may be reacted further with an ethylenically unsaturated acid, such as acrylic acid or methacrylic acid, whereby there are introduced into the non-solvatable component of the copolymer double bonds which can copolymerise with the main monomer or monomers during the polymerisation process.

Where the block or graft copolymer contains reactive groupings as just described, it is preferred that there should be present on average of from 1 to 20 such groupings in each copolymer molecule.

When the copolymer stabiliser is produced in situ during the polymerisation, rather than introduced into the polymerisation mixture as a pre-formed constituent, it may be generated from a precursor compound containing in the molecule a polymer chain which is per se soluble in the aqueous phase (and from which the solvatable component of the stabiliser is to be derived); the precursor compound is required to be capable of undergoing grafting by some or all of the monomers being polymerised; this may be achieved either through the precursor compound containing an unsaturated grouping with which the monomer or monomers can copolymerise, or through the presence in the precursor compound of atoms of hydrogen which are abstractable under the conditions of polymerisation. It is believed that, as a result of such copolymerisation or grafting, there is produced an amphipathic graft copolymer having the same general characteristics as those of the pre-formed block or graft copolymer referred to earlier. The water-soluble polymer from which a copolymerisable precursor is derived may be any of those polymers which have been described above in connection with the pre-formed block or graft copolymer. The preferred water-soluble polymers are again the polyethylene glycols, or their monoalkyl ethers, of molecular weight in the range 2000–4000. In the case where the precursor is an unsaturated derivative of a polyethylene glycol, or its monoalkyl ether, it may conveniently be an ester thereof with a copolymerisable unsaturated acid, such as methacrylic acid, itaconic acid or maleic acid; an example of such a precursor is the methacrylic acid ester of the monomethyl ether of polyethylene glycol of molecular weight 2000. Esterification of the glycol, or ether thereof, may be effected by an ester-interchange reaction with a lower alkyl ester of the unsaturated acid, for example with methyl methacrylate; alternatively the glycol or its ether may be reacted with a suitable acid chloride, for example methacrylyl chloride, in the presence of a hydrogen chloride acceptor. Yet again, the glycol or its ether may be reacted directly with the unsaturated acid to give the ester, or with its anhydride to form a half-ester. Other suitable precursors may be obtained by reacting a carboxyl group-terminated polyvinylpyrrolidone (see British Specification No. 1,096,912) with glycidyl methacrylate. Yet other suitable precursors may be obtained by the procedure described in our published British Patent Application No. 2051096A; that is to say by reacting a water-soluble polyalkylene glycol or its monoalkyl ether with a cyclic aliphatic carboxylic anhydride and then reacting the resulting half-ester with an epoxy compound containing a polymerisable double bond. For example, the monoethyl ether of a polyethylene glycol is reacted with succinic anhydride and the product then condensed with glycidyl methacrylate to give a precursor containing a terminal vinyl grouping. As explained in the published Application referred to, this method of making a precursor is convenient because it avoids the necessity of removing any by-products or excess reagents, which could interfere with the subsequent use of the precursor, that arises with most of the other methods discussed above. Another suitable precursor is the monomethyl monovinylbenzyl ether of polyethylene glycol, obtained by reacting vinylbenzyl chloride with the sodium derivative of the monomethyl ether of polyethylene glycol.

A water-soluble polymer containing abstractable hydrogen atoms, whereby it can undergo grafting by the monomer(s) being polymerised, may be linear or branched and either homopolymeric or copolymeric in nature, but it is "simple" in the sense that all polymeric components of the molecule are soluble in the aqueous medium (as contrasted with an amphipathic block or graft copolymer of the kind which acts as the actual stabilising species in the process). In practice, any water-soluble polymer is suitable, since all such polymers contain some potentially abstractable hydrogen atoms, but preferred polymers include polyvinyl pyrrolidone, polyvinyl alcohol, hydroxyalkylcelluloses, in particular hydroxyethyl cellulose, polyacrylamide, polymethacrylamide, water-soluble polyalkylene oxides including poly(ethylene oxide) and random copolymers of ethylene oxide with propylene oxide containing at least 40% of ethylene oxide, and monoalkyl ethers of such polyalkylene oxides. Other suitable polymers include water-soluble nitrogen resins, such as water-soluble melamine formaldehyde condensates. Advantageously, the soluble polymer may contain in the molecule deliberately introduced groups which are especially susceptible to abstraction of hydrogen by a neighbouring free radical. Such groups include mercapto-, sec-butyl, cyanomethyl and $(CH_3)_2N\,CH_2-$ groups and examples of suitable water-soluble polymers containing these include copolymers of vinylpyrrolidone with minor proportions of dimethylaminoethyl methacrylate, sec-butyl methacrylate or vinyl cyanoacetate. This method of forming the stabiliser copolymer in situ is in practice rather less favoured than the method employing a precursor containing a copolymerisable grouping, for the reason that the abstraction of hydrogen atoms usually proceeds more satisfactorily when peroxide-type polymerisation initiators are present than when azo-type initiators such as are required for the present invention are used.

The proportion of pre-formed copolymer stabiliser, or of precursor compound (as the case may be), which is added to the polymerisation mixture according to the first embodiment of the process of the invention, will vary to some extent according to the particular disperse polymer which is involved and the disperse particle size which it is desired that the resulting dispersion should have, but the optimum proportion in any individual case can readily be found by simple experiment. Typical proportions of stabilisers are in the range 0.5–20%, and more especially 5–10%, of the weight of monomer which is to be polymerised.

Proportions required of a precursor, where used, will, of course, be pro rata somewhat less than these.

According to the second embodiment of the invention distinguished above, the polymerisation initiator itself incorporates in the molecule a water-soluble polymer chain, and the use of a separate block or graft copolymer or a separate precursor therefor is then not necessary, although such constituents may additionally be present if desired. In this form of the process, the free radical formed on thermal decomposition of the initiator acts as a starting point for the growth of a polymer chain consisting of units of the monomer or monomers being polymerised, and this is believed to result in the production of an amphipathic graft copolymer similar in type to those discussed earlier but in addition being itself a free radical. The polymer chain present in the molecule of the initiator is required to have a molecular weight of at least 700 and to be solvatable by the aqueous phase of the polymerisation mixture, that is to say, if the chain in question were an independent molecule, it would actually be soluble in the aqueous phase. As in the case of the first embodiment of the invention previously described, preferred initiators of this type are those which exhibit a distribution ratio between water and pure styrene of at least 12, and preferably of at least 20.

Classes of azo compounds suitable for use in this embodiment include the following:

(v) Compounds satisfying the foregoing distribution ratio requirement and having the general formula:

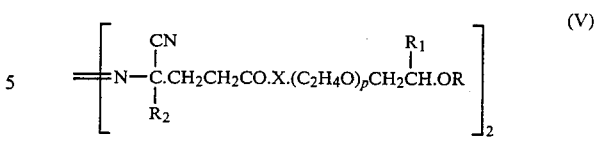

in which R, $R_1$ and $R_2$ have the same significance as in formula (I) above, X is oxygen or a group —NH— and p is an integer from 10 to 100, preferably from 20 to 50.

The compounds in question are thus either esters or substituted amides of an azobiscarboxylic acid and they contain poly(oxyethylene) groups and in some cases also hydroxyl groups. An example of a suitable initiator of this class is the bis-amide of 4,4'-azobis(cyanopentanoic acid) and α-amino-ω-hydroxy-poly(oxyethylene) of mol. wt. 1600, having the formula:

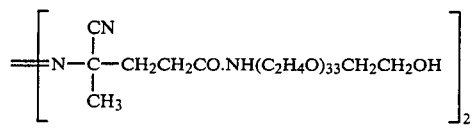

The preparation of this compound from the aminohydroxy compound and the corresponding acid chloride, and of related compounds, is described in U.S. application Ser. No. 469,127, filed 2-23-83, now abandoned.

(vi) Compounds satisfying the foregoing distribution ratio requirement and having the general formula:

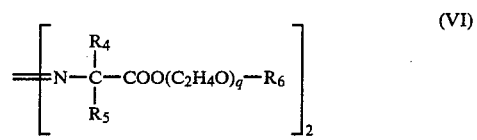

wherein $R_4$, $R_5$ and $R_6$ have the same significance as in formula (II) above and q is an integer from 10 to 100, preferably from 20 to 50.

An example of a suitable initiator of this class is the bis-ester of the monomethyl ether of polyethylene glycol, mol. wt. 2000, and 2,2'-azobis-(2-methylpropanoic acid) having the formula:

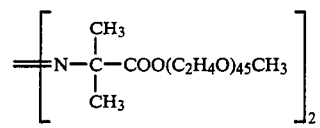

This compound is further described in U.S. application No. 440,342, filed 11-9-82, now abandoned, and its preparation from stoichiometric proportions of 2,2'-azobis(2-methylpropionitrile) and the monomethyl ether of polyethylene glycol, via the corresponding bis(iminoether), is described in U.S. application No. 440,343, filed 11-9-82, now abandoned.

(vii) Compounds satisfying the foregoing distribution ratio requirement and having the general formula:

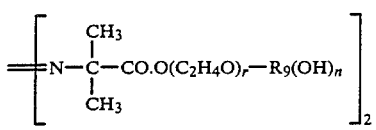

$$\left[ =N-\underset{\underset{CH_3}{|}}{\overset{\overset{CH_3}{|}}{C}}-CO.O(C_2H_4O)_r-R_9(OH)_n \right]_2 \quad \text{(VII)}$$

where $R_9$ and n have the same significance as in formula (IV) above, and r is an integer from 10 to 100, preferably from 20 to 50.

Examples of suitable initiators of this class include the esters of 2,2′-azobis(2-methylpropanoic acid) with 1-poly-(ethyleneoxy)-glycerol containing 30 (ethyleneoxy) units and with the condensate of 1 mole of D-gluco-furanose with 24 moles of ethylene oxide. The preparation of these compounds is described in our British Application No. 8308951 already referred to.

Suitable proportions of initiators incorporating water-soluble polymer chains which may be used according to this second embodiment of the invention will lie in the range 5% to 10% of the weight of monomer which is to be polymerised. However, a preferred procedure in this embodiment is to employ, in addition to the initiator containing in the molecule a water-soluble polymer chain, an initiator as previously defined not containing such a chain. The proportion of azo groups present in a given weight of initiator is clearly lower in the case of the polymeric type than it is in the case of the non-polymeric type, and hence a level of usage of the polymeric initiator which is satisfactory from the point of view of production of the necessary amphipathic graft copolymer stabiliser may not be adequate in respect of the generation of free radicals and the resulting rate of polymerisation of the monomer or monomers achieved. The level of free radical generation can be increased without affecting the formation of graft copolymer by including a suitable proportion of non-polymeric initiator. Again, optimum proportions can easily be determined by experiment, but the proportion of the nonpolymeric initiator used is preferably sufficient to bring the total amount of initiator of both kinds into the range 0.1 mol % to 3 mol % previously indicated.

The first step in carrying out the process of the invention is the emulsification of the monomer or monomers to be polymerised, in the aqueous phase of the polymerisation mixture which will normally contain not only water but also the water-soluble polymerisation initiator and may also contain, according to the embodiment of the invention which is being followed, the block or graft copolymer stabiliser or a precursor from which the stabiliser is to be derived. It may be possible to secure and maintain an emulsion of monomer droplets of a sufficient degree of fineness by merely subjecting the polymerisation mixture to high-shear or ultrasonic treatment, but usually it will be desirable to include in the mixture a surfactant whereby emulsification can be assisted. Such a surfactant must, of course, be of the non-ionic type in order to accord with the object of the invention of producing a polymer dispersion totally free from ionic or charged species. Examples of suitable non-ionic surfactants include the ethylene oxide condensates of alkylphenols, e.g. the condensate of 1 mol of nonylphenol with 20 mols of ethylene oxide (commercially available as "Levelan" P208) or the oleic acid ester of polyethylene glycol, mol. wt. 400 (commercially available as "Ethylan" A4) ("Levelan" and "Ethylan" are Registered Trade Marks).

There may also be present during the polymerisation process a chain transfer agent which, like the initiator, is soluble in the aqueous medium. An example of a suitable agent is thioglycollic acid. The chain transfer agent may be used in an amount of from 0.1% to 2% of the weight of monomer. The effect of the chain transfer agent is to regulate the molecular weight of the disperse polymer and ultimately to reduce the proportion of finer particles in the disperse phase, thus increasing the average particle size. It is, however, preferred not to use a chain transfer agent when the copolymer stabiliser is to be generated from a soluble polymer having abstractable hydrogen atoms.

In carrying out the process of the invention, it is possible to introduce the whole of the monomer or monomers to be polymerised into the aqueous medium all at once; this may conveniently be described as a "one-shot" procedure. As already indicated, this monomer becomes emulsified in the aqueous medium and provides a reservoir from which monomer is gradually drawn as polymerisation proceeds until all of it has converted to disperse polymer. An alternative, and preferred, procedure is to add initially to the aqueous medium part of the monomer only, this being emulsified and allowed to polymerise to form a dispersion of fine "seed" polymer particles, after which the remainder of the monomer is gradually added, with resulting growth of the particles. This may be referred to as a "seed and feed" process; its chief advantage is that it enables better control of the particle size of the polymer dispersion to be achieved.

The process may be carried out over a wide range of temperatures, depending on the particular monomer or monomers being polymerised, the particular initiator employed and the rate of polymerisation desired; it is in addition important that the temperature employed should not be so high that the solvatable component of the stabiliser ceases to be effectively solvatable by the aqueous phase. In most cases, however, the polymerisation temperature will lie in the range 50°–100° C., preferably 50°–80° C.

In general, the polymerisation process is carried out following the operational procedures and employing the equipment (e.g. reaction vessel and stirrer configuration) which are well established in the emulsion polymerisation field and which are known to those skilled in the art.

The invention is illustrated but not limited by the following Examples, in which percentages are by weight. The polymer latices obtained were subjected to determination of particle size and distribution by means of the "Nanosizer" (Registered Trade Mark), an instrument matketed in the U.K. by Coulter Electronics Limited. The results of this determination are expressed by two numbers, e.g. 3:361; the first number is a measure of the degree of polydispersity of the latex particles on an arbitrary scale from 0 (monodisperse) to 10, and the second number is the average size of the particle in nanometers.

EXAMPLE 1

The methacrylic acid ester of the monomethyl ether of polyethylene glycol mol. wt. 2000 (1.38 g) was dissolved in water (80 g). The bis(diethanolamide) of 4,4′-azobis(cyanovaleric acid) (0.138 g) was dissolved in one half of the resulting solution, while methyl methacrylate (6 g) was suspended in the other half using ultrasonic agitation. The two liquids were combined and agitated ultrasonically at 50° C. under a nitrogen atmosphere for 4½ hours. The resulting polymer latex was bit-free and "Nanosizer" examination gave a result of 0:330. The latex did not visibly flocculate on addition of 10% aqueous calcium chloride solution.

When the above procedure was repeated, but with the difference that the bis(diethanolamide) and methyl methacrylate charges were simply added to the whole of the aqueous solution of the polyethylene glycol ether ester and the combined reaction mixture heated with stirring for 45 minutes under a nitrogen atmosphere whilst being heated in a water bath maintained at 65°–70° C., a considerable amount of coagulation developed but the latex portion of the product gave on "Nanosizer" determination a result of 5:334. This latex also did not visibly flocculate on addition of 10% aqueous calcium chloride solution.

EXAMPLE 2

The bis-amide of 4,4'-azobis(cyanovaleric acid) and α-amino-ω-hydroxypoly(oxyethylene) mol. wt. 1600 (1.0 g) was dissolved in water (80 g) and charged to a round-bottomed flask fitted with a nitrogen inlet and stirred by a magnetic follower. The contents of the flask were heated by means of a water bath maintained at 65°–70° C. and methyl methacrylate (6 g) was added. After heating with stirring had been continued for 1½ hours, a polymer latex was obtained which on "Nanosizer" examination gave a result of 6:612.

COMPARATIVE EXAMPLE A

The methacrylic acid ester of the monomethyl ether of polyethylene glycol mol. wt. 2000 (1.38 g) was dissolved in water (80 g) and 2,2'-azobis(2-methylpropionitrile) (59 mg) was added followed by methyl methacrylate (6 g). The mixture was heated with stirring at 65°–70° C. under a nitrogen atmosphere for 3½ hours, at the end of which time it was observed that no latex formation had occurred.

COMPARATIVE EXAMPLE B

The methacrylic acid ester of the monomethyl ether of polyethylene glycol mol. wt. 2000 (1.38 g) was dissolved in water. 2,2'-Azobis(2-methylpropionitrile) (59 mg) was dissolved in methyl methacrylate (6 g). The two solutions were then combined and the mixture heated with stirring at 65°–70° C. under a nitrogen atmosphere for 3 hours. At the end of this time a large amount of coagulum had formed; "Nanosizer" examination of the accompanying latex gave a result of 9:2640.

Examples 1 and 2 above illustrate "one-shot" procedures according to the invention, utilising a precursor for in situ formation of the steric stabiliser and an initiator containing a stabilising polymeric grouping, respectively. Comparative Examples A and B show the effect of substituting the preferentially water-soluble initiator by an initiator which is substantially water-insoluble but is soluble in the monomer; no significant polymerisation occurs unless this initiator is actually dissolved beforehand in the monomer, and the result then is mainly "microbulk" polymerisation followed by coagulation.

Examples 3–6 below illustrate "seed-and-feed" procedures according to the invention employing a stabiliser precursor and a surfactant at various levels. Examples 7 and 8 show a similar procedure but omitting both the precursor and the surfactant and utilising instead an initiator containing a stabilising polymer chain.

EXAMPLE 3

| "Seed" charge | |
|---|---|
| Water | 300 g |
| Methacrylic ester of monomethyl ether of polyethylene glycol mol. wt. 2000 | 7.0 g |
| Condensate of nonylphenol + 20 mols ethylene oxide | 10.0 g |
| Butyl acrylate | 10.0 g |
| Methyl methacrylate | 13.0 g |
| Bis(diethanolamide) of 4,4'-azobis-(cyanovaleric acid) | 1.0 g |
| First "feed" charge | |
| Methacrylic ester stabiliser precursor (as in "seed" charge) | 7.0 g |
| Nonylphenol-ethylene oxide condensate | 10.0 g |
| Butyl acrylate | 30.0 g |
| Methyl methacrylate | 39.0 g |
| Second "feed" charge | |
| Methacrylic ester stabiliser precursor (as in "seed" charge) | 7.0 g |
| Nonylphenol-ethylene oxide condensate | 10.0 g |
| Butyl acrylate | 40.0 g |
| Methyl methacrylate | 52.0 g |

The "seed" charge was placed in a 700 ml round-bottomed flask fitted with an inlet for maintaining a nitrogen atmosphere, an anchor-type stirrer with baffle bar, a water-cooled condenser, a dropping funnel and a stoppered access for addition of initiator. The contents of the flask were stirred and heated in a water-bath maintained at 70°–80° C. After 1 hour, "Nanosizer" examination of the product gave a result of 3:68. The first "feed" charge was then added over a period of 3 hours, accompanied by addition of the bis-(diethanolamide) initiator (0.5 g) in three portions each dissolved in a small amount of water. The second "feed" charge was added over a period of 80 minutes accompanied by the addition of the bis(diethanolamide) initiator (1 g). The reaction mixture was then cooled and stirred for a further 16 hours. "Nanosizer" examination of the resulting latex gave a result of 3:124; the solids content was 25.6%. A further quantity of initiator (1 g) was added and the reaction mixture heated at 80° C. for 2 hours. The product was a latex free from coagulum, of solids content 38%. The "Nanosizer" result was now 1:162.

In the above preparation, the amounts of surfactant and stabiliser precursor were 16.3% and 11.4% respectively based on the total monomer taken.

EXAMPLE 4

| "Seed" charge | |
|---|---|
| Water | 300 g |
| Methacrylic ester of monomethyl ether of polyethylene glycol mol. wt. 2000 | 7.0 g |
| Condensate of nonylphenol + 20 mols ethylene oxide | 4.0 g |
| Methyl methacrylate | 13.0 g |
| Butyl acrylate | 10.0 g |
| Bis(diethanolamide) of | 1 g |
| 4,4'-azobis-(cyanovaleric acid) | 2 g |
| First "feed" charge | |
| Methacrylic ester stabiliser precursor (as in "seed" charge) | 7.0 g |

-continued

| | |
|---|---|
| Nonylphenol-ethylene oxide condensate | 4.0 g |
| Methyl methacrylate | 39.0 g |
| Butyl acrylate | 30.0 g |
| Second "feed" charge | |
| Methacrylic ester stabiliser precursor (as in "seed" charge) | 7.0 g |
| Nonylphenol-ethylene oxide condensate | 4.0 g |
| Methyl methacrylate | 52.0 g |
| Butyl acrylate | 40.0 g |

Using the same apparatus as in Example 3, the "seed" charge, including 1 g of the bis-(diethanolamide) initiator, was stirred and heated at 80° C. for 1 hour, followed by the remaining 2 g of initiator. After a further hour's heating, "Nanosizer" examination gave a result of 0:92. The first feed charge was then added, accompanied by 2 g of bis(diethanolamide) initiator, over a period of 100 minutes, at the end of which a further 2 g of initiator was introduced. The second feed charge was then added over a period of 3 hours, 4 g of the initiator being introduced in two equal portions during that time. Finally the reaction mixture was heated for a further 2 hours. The resulting latex had a solids content of 36% and "Nanosizer" examination gave a result of 3:171.

In the above preparation, the amounts of surfactant and stabiliser precursor were 6.5% and 11.4% respectively, based on the total monomer taken.

EXAMPLE 5

| | |
|---|---|
| "Seed" charge | |
| Water | 300 g |
| Methacrylic ester of monomethyl ether of polyethylene glycol mol. wt. 2000 | 7.0 g |
| Condensate of nonylphenol + 20 mols of ethylene oxide | 4.0 g |
| Methyl methacrylate | 13.0 g |
| Butyl acrylate | 10.0 g |
| Bis(diethanolamide) of 4,4'-azobis- (cyanovaleric acid) | 1.5 g / 2.2 g |
| First "feed" charge | |
| Methacrylic ester stabiliser precursor (as in "seed" charge) | 14.0 g |
| Nonylphenol-ethylene oxide condensate | 4.0 g |
| Methyl methacrylate | 65.0 g |
| Butyl acrylate | 50.0 g |
| N—Butoxymethylacrylamide (60% solution in butanol) | 16.0 g |
| Methacrylic acid | 4.0 g |
| Second "feed" charge | |
| Nonylphenol-ethylene oxide condensate | 2.0 g |
| Methyl methacrylate | 26.0 g |
| Butyl acrylate | 20.0 g |
| N—Butoxymethylacrylamide (60%) | 4.0 g |
| Methacrylic acid | 1.0 g |

Using the same apparatus as in Example 3, the "seed" charge was stirred and heated to 80° C., when the first portion (1.5 g) of bis-(diethanolamide) initiator was added; the second portion (2.2 g) was added 30 minutes later. After a further 30 minutes, the first "feed" charge was added dropwise over a period of about 2 hours, 1 g of initiator being introduced at the beginning and 2 g at the end. The reaction mixture was allowed to cool and was stirred overnight. "Nanosizer" examination of this intermediate product gave a result of 7:647. The mixture was then heated to 80° C., 2 g of initiator added and the second "feed" charge then run in over a period of 1 hour; Thereafter a further 2 g of initiator was added and heating continued for 2 hours more. The resulting latex, which contained some bits, had a solids content of 39% and a viscosity (determined by high-shear cone and plate viscometer) of 5.6 poise. "Nanosizer" determination gave the result 7:310. The amounts of surfactant and stabiliser precursor used in the above preparation were 5% and 10.5% respectively, based on the total monomer taken.

EXAMPLE 6

| | |
|---|---|
| "Seed" charge | |
| Water | 300 g |
| Methacrylic ester of monomethyl ether of polyethylene glycol mol. wt. 2000 | 4.5 g |
| Condensate of nonylphenol + 20 mols of ethylene oxide | 3.7 g |
| Methyl methacrylate | 13 g |
| Butyl acrylate | 10 g |
| Bis(diethanolamide) of 4,4'-azobis- (cyanovaleric acid) | 1 g |
| First "feed" charge | |
| Methacrylic ester stabiliser precursor (as in "seed" stage) | 8.4 g |
| Nonylphenol-ethylene oxide condensate | 3.7 g |
| Methyl methacrylate | 65 g |
| Butyl acrylate | 50 g |
| Second "feed" charge | |
| Nonylphenol-ethylene oxide condensate | 1.8 g |
| Methyl methacrylate | 26.0 g |
| Butyl acrylate | 20.0 g |

Using the same apparatus as in Example 3, the "seed" charge was stirred and heated to 80° C. for 1 hour; after this, the first "feed" charge was run in over a period of 2 hours together with 30 ml of a solution of the bis(diethanolamide) initiator (7 g) in water (50 ml). The second "feed" charge was then added over a period of 1 hour together with the remainder of the initiator solution, and the reaction mixture finally maintained at 80° C. for a further 90 minutes. A bit-free latex resulted, for which "Nanosizer" determination gave the result 4:195. The amounts of surfactant and stabiliser precursor used in the above preparation was 5% and 7% respectively, based on the total monomer taken.

The above procedure was repeated, using the following different amounts of the surfactant and the stabiliser precursor:

| | 'Seed' charge | First 'feed' charge | Second 'feed' charge | Total amount (on total monomer) |
|---|---|---|---|---|
| Nonylphenol-ethylene oxide condensate. | 1.8 g | 1.8 g | 1.0 g | 2.5% |
| Methacrylic ester precursor. | 6.1 g | 12.3 g | — | 10.0% |

The resulting latex was coarse ("Nanosizer" determination gave the values 8:435) and there was some coagulum formation on the walls of the reaction vessel.

EXAMPLE 7

| 'Seed' charge | |
| --- | --- |
| Water | 200 g |
| Methyl methacrylate | 5.25 g |
| Butyl acrylate | 5.0 g |
| Bis-amide of 4,4'-azobis(cyanovaleric acid) and α-amino-ω-hydroxypoly(oxyethylene), mol. wt. 1600 | 4.0 g |
| First 'feed' charge | |
| Methyl methacrylate | 48.7 g |
| Butyl acrylate | 41.3 g |
| N—Butoxymethylacrylamide, (60% in butanol) | 11.0 g |
| Methacrylic acid | 2.75 g |
| Second 'feed' charge | |
| Methyl methacrylate | 20.0 g |
| Butyl acrylate | 18.0 g |
| N—Butoxymethylacrylamide (60%) | 5.0 g |
| Methacrylic acid | 3.0 g |

The 'seed' charge was placed in a 2-liter round-bottomed flask fitted with an inlet for maintaining a nitrogen atmosphere, turbine stirrer, water condenser and two dropping funnels. The charge was heated (by means of a water-bath at 80° C.) and stirred. After 30 minutes, the formation of some coagulum on the wall of the flask was observed. After 1 hour, a sample was removed for "Nanosizer" examination, giving a result of 1:229. The first 'feed' charge was then added, at a rate of about 1 ml/min., together with the polyoxyethylene amide initiator (as in the 'seed' charge) (3.6 g) and the bis(diethanolamide) of 4,4'-azobis(cyanovaleric acid) (3.5 g), followed after 2 hours by the second 'feed' charge, at a similar rate, together with 0.5 g of the bis(diethanolamide) initiator. The resulting latex was filtered through nylon mesh to remove a considerable amount of coagulum; the filtered material gave a "Nanosizer" result of 3:1870.

EXAMPLE 8

| 'Seed' charge | |
| --- | --- |
| Water | 300 g |
| Methyl methacrylate | 13 g |
| Butyl acrylate | 10 g |
| Bis-ester of monomethyl ether of polyethylene glycol, mol. wt. 2000 and 2,2'-azobis-(2-methylpropanoic acid) | 5 g |
| 'Feed' charge | |
| Methyl methacrylate | 65 g |
| Butyl acrylate | 50 g |

The bis-ester initiator/stabiliser precursor was dissolved in the water and the solution charged to a 700 ml round-bottomed flask fitted with an inlet for maintaining a nitrogen atmosphere, condenser, provision for feeding in of monomer and further initiator, and turbine stirrer. The 'seed' charge monomers were added and the mixture heated with stirring at 80° C. for 2 hours. At the end of this time, "Nanosizer" examination of the seed dispersion gave the result of 4:164. The 'feed' monomer charge was then added over a period of 4 hours, together with further bis-ester initiator/stabiliser precursor (20 g) dissolved in water (20 g). The reaction mixture was maintained at 80° C. for a further 1 hour after the additions were complete, then allowed to cool and filtered through nylon mesh to remove bits. The result of "Nanosizer" determination on the resulting latex was 0:651.

Examples 9-13 which follow illustrate 'one-shot' procedures utilising a stabiliser precursor and a surfactant. Comparative Example C shows the effect of using an initiator which does not meet the previously stipulated distribution ratio limit, i.e. one which is too soluble in the monomer used.

EXAMPLE 9

The condensate of nonylphenol with 20 mols of ethylene oxide (2.0 g) and the methacrylic acid ester of the monomethyl ether of polyethylene glycol mol.wt. 2000 (2 g) were dissolved in deionised water (100 g), then vinyl acetate (20 g) and the bis-(diethanolamide) of 4,4'-azobis(cyanovaleric acid) (0.52 g) dissolved in a little deionised water were added. The mixture was heated under a nitrogen atmosphere in a water bath maintained at 80° C., with stirring, for 5 hours. The product was a bit-free polymer latex, having a solids content corresponding to 74% conversion of the monomers and giving a "Nanosizer" result of 4:602.

EXAMPLE 10

The procedure of Example 9 was repeated, but replacing the vinyl acetate by an equal weight of styrene. After a heating period of 4 hours, a little coagulated polymer was observed on the wall of the reaction vessel but the main product was a bit-free latex having a solids content corresponding to a monomer conversion of 96%; the result of "Nanosizer" determination was 7:209.

EXAMPLE 11

The condensate of nonylphenol with 20 mols of ethylene oxide (1 g) and the methacrylic acid ester of the monomethyl ether of polyethylene glycol mol.wt. 2000 (2 g) were dissolved in water (200 g) and the solution charged to a 700 ml round-bottomed flask together with methyl methacrylate (10 g), butyl acrylate (10 g) and the bis(diisopropanolamide) of 4,4'-azobis(cyanovaleric acid) (0.5 g). The reaction mixture was heated under a nitrogen atmosphere with stirring at 70° C. for 4 hours. The resulting polymer latex was bit-free and had a solids content corresponding to 86% conversion of the monomers; "Nanosizer" determination gave a result of 1:181.

EXAMPLE 12

The procedure of Example 11 was repeated, but with the additional inclusion in the monomer charge of dimethylaminoethyl methacrylate (10 g). A 64% conversion of monomer was achieved after heating for 3 hours at 75° C. to give a latex which contained some bits and gave a "Nanosizer" result of 2:405.

EXAMPLE 13

The procedure of Example 12 was repeated, but using as the initiator the bis(diethanolamide) of 4,4'-azobis(cyanovaleric acid) (0.5 g) in place of the bis(diisopropanolamide). After 4 hours' heating at 70° C., a 64% conversion of monomer had taken place to give a latex which contained some bits and gave a "Nanosizer" result of 4:387.

COMPARATIVE EXAMPLE C

The procedure of Example 9 was repeated, but employing as the monomer charge a mixture of ethyl acrylate (20 g) and benzyl methacrylate (10 g), and as the initiator the bis(ethanolamide) of 4,4′-azobis(cyanovaleric acid). After reaction at 75° C. for 3 hours, a product was obtained which contained a large proportion of bits; "Nanosizer" determination on the latex separated from the bits gave the result 7:638. The conversion of monomer was 91.5%.

In the following Examples 14 and 15, further 'seed and feed' preparations are described in which the reaction vessel employed had a flat bottom and vertical sides ("culture vessel" type) so that, when used in conjunction with a PTFE-bladed stirrer, the reaction charge was caused to form a deep vortex into which the incoming monomers were delivered so as to achieve rapid and efficient mixing. The vessel was fitted with provision for maintaining a nitrogen atmosphere. In Example 15, the level of surfactant was increased substantially above the levels shown in the preceding Examples, with a resulting reduction in 'bit' formation. Comparative Example D again shows the effect of using an initiator which is too monomer-soluble.

EXAMPLE 14

| 'Seed' charge | |
|---|---|
| Deionised water | 170 g |
| Methacrylic ester of monomethyl ether of polyethylene glycol mol. wt. 2000 | 2 g |
| Condensate of nonylphenol + 20 mols ethylene oxide | 1 g |
| Methyl methacrylate | 10 g |
| Butyl acrylate | 10 g |
| Bis(diisopropanolamide) of 4,4′-azobis(cyanovaleric acid) | 0.5 g |
| 'Feed' charge | |
| Methyl methacrylate | 40 g |
| Butyl acrylate | 40 g |
| Methacrylic ester stabiliser precursor (as in 'seed' charge) | 4.4 g |
| Nonylphenol-ethylene oxide condensate | 1.2 g |
| Bis(diisopropanolamide) (as in 'seed' charge; dissolved in 20 ml of water) | 2.5 g |

The 'seed' charge was polymerized by heating at 80° C. for 2½ hours. The 'feed' charge was added over a period of 3 hours at the same temperature. The resulting latex contained some bits: "Nanosizer" determination gave a result of 3:202.

EXAMPLE 15

| 'Seed' charge | |
|---|---|
| Deionised water | 200 g |
| Methacrylic ester stabiliser precursor (as in Example 14) | 2.2 g |
| Condensate of nonylphenol + 20 mols ethylene oxide | 2.2 g |
| Methyl methacrylate | 9.6 g |
| Butyl acrylate | 8.3 g |
| Bis(diisopropanolamide) initiator (as in Example 14: dissolved in 20 ml of water) | 0.9 g |
| First 'feed' charge | |
| Methyl methacrylate | 69.8 g |
| Butyl acrylate | 60.8 g |
| Hydroxyisopropyl methacrylate | 16.8 g |
| Methacrylic ester stabiliser precursor (as in Example 14) | 8.8 g |
| Nonylphenol-ethylene oxide condensate | 5.9 g |
| Bis(diisopropanolamide) initiator | 7.38 g |
| (as in Example 14: dissolved in 20 ml of water) | |
| Second 'feed' charge | |
| Methyl methacrylate | 17.2 g |
| Butyl acrylate | 14.2 g |
| Hydroxyisopropyl methacrylate | 3.6 g |
| Nonylphenol-ethylene oxide condensate | 1.4 g |
| Bis(diisopropanolamide) initiator (as in Example 12: dissolved in 10 ml of water) | 1.7 g |

The 'seed' charge was polymerised at 75°-80° C. for a period of 3 hours; "Nanosizer" determination then gave a result of 3:147. 'Feed' charge 1 was added over 3 hours ("Nanosizer" result, 1:224) followed by 'feed' charge 2 over 1 hour together with a further 'spike' of initiator (0.9 g, dissolved in 2 ml of water). The latex finally obtained had a solids content of 44%, indicating a monomer conversion of 92%. After removal of some bits (amounting to about 2%) by filtration, "Nanosizer" determination gave a result of 3:236.

COMPARATIVE EXAMPLE D

An attempt was made to repeat the procedure of Example 15, replacing the bis(diisopropanolamide) initiator by the corresponding bis(ethanolamide). Even at the 'seed' stage, a very 'bitty' and coarse latex was obtained ("Nanosizer" result, 9:601), and the experiment was abandoned.

In the following Examples 16 and 17, the reaction vessel and stirrer used were of the same type as those described in Examples 14 and 15, but a "one-shot" procedure was employed.

EXAMPLE 16

The condensate of nonylphenol with 20 mols of ethylene oxide (2.0 g) and the methacrylic acid ester of the monomethyl ether of polyethylene glycol mol.wt. 2000 (2.0 g) were dissolved in styrene (20 g) and the solution mixed with stirring with deionised water (100 g). There was then added a solution in a little water of the ester of 2,2′-azobis(2-methylpropanoic acid) and 1-tetra(ethyleneoxy) glycerol having the formula

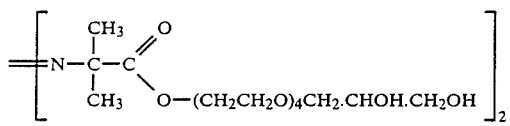

(1.0 g). The reaction mixture was heated on the water bath at 75° C. under a nitrogen atmosphere for 3 hours. The product contained some bits (about 1.1 g) but when these were separated from the latex the latter was found to have a solids content of 14.2% (corresponding to a 78% conversion of monomer). The result of "Nanosizer" determination was 9:266.

EXAMPLE 17

The condensate of nonylphenol with 20 mols of ethylene oxide (2.0 g) was dissolved in deionised water (100 g). The methacrylic acid ester of the monomethyl ether of polyethylene glycol mol.wt. 2000 (2.0 g) was dissolved in styrene (20 g) and the resulting solution then mixed with the aqueous solution. The initiator employed was an analogous compound to that described in Example 16 but with an average of 6.2 (ethyleneoxy) units in the chain instead of 4; 1.0 g of this initiator was added, dissolved in a little water, to the mixture previously mentioned. Polymerisation was effected at 70°–75° C. for 3 hours under a nitrogen atmosphere. The latex obtained contained only a small proportion of bits and had a solids content of 16.9%, corresponding to 93% conversion of monomer. The result of "Nanosizer" determination was 2:179.

We claim:

1. A process for the preparation of a sterically stabilised aqueous polymer dispersion, in which at least one ethylenically unsaturated monomer, having a solubility in water in the range 0.08%–8% by weight but giving rise to a polymer which is insoluble in water, is emulsified in water and is subjected in that state to polymerisation in the presence of (a) a non-ionisable free-radical organic azo polymerisation initiator which is water-soluble and is substantially insoluble in the monomer or monomers, having a distribution ratio between water and pure styrene of at least 12 and (b) a precursor for the formation in situ of an amphipathic block or graft copolymer steric stabiliser for the polymer particles produced, the said precursor containing in the molecule a polymer chain derived from a polyethylene glycol, or a monomethyl ether thereof, of molecular weight in the range 2000–4000, and also containing in the molecule an unsaturated grouping with which the monomers can copolymerise, the azo initiator being present in an amount of from 0.1 mol % to 3.0 mol % of the amount of monomer being polymerised and the stabiliser precursor being present in an amount such as to provide, after copolymerization with the monomers, from 0.5% to 20% by weight of stabiliser based on the monomer being polymerised.

2. A process as claimed in claim 1, wherein the initiator is the bis(diethanolamide) or bis(diisopropanolamide) of 4,4'-azobis(cyanopentanoic acid).

3. A process as claimed in claim 1, wherein the initiator is the bis-ester of 2,2'-azobis(2-methylpropanoic acid) with 2-ethoxyethanol.

4. A process as claimed in claim 1, wherein the initiator is the bis(1,2-dihydroxypropyl)ester or the bis(5,6-dihydroxyhexyl)ester of 2,2'-azobis(2-methylpropanoic acid).

5. A process as claimed in claim 1, wherein the emulsification of the monomer is assisted by the presence of a non-ionic surfactant.

6. A process as claimed in claim 1, wherein there is also present, during the polymerisation, a chain transfer agent.

7. A process as claimed in claim 1 in which the initiator is the bis-amide of 4,4'-azobis(cyanopentanoic acid) and -amino- -hydroxypoly(oxyethylene) of molecular weight 1600.

8. A process as claimed in claim 1 wherein the initiator is the bis-ester of the monomethyl ether of polyethylene glycol of molecular weight 2000 and 2,2'-azobis(2-methylpropanoic acid).

9. A process as claimed in claim 1 in which the initiator is the ester of 2,2'-azobis-(2-methylpropanoic acid) with 1-poly(ethyleneoxy)-glycerol.

* * * * *